March 29, 1927.
W. VAN TASSEL
HORSESHOE
Filed April 19, 1926
1,622,748
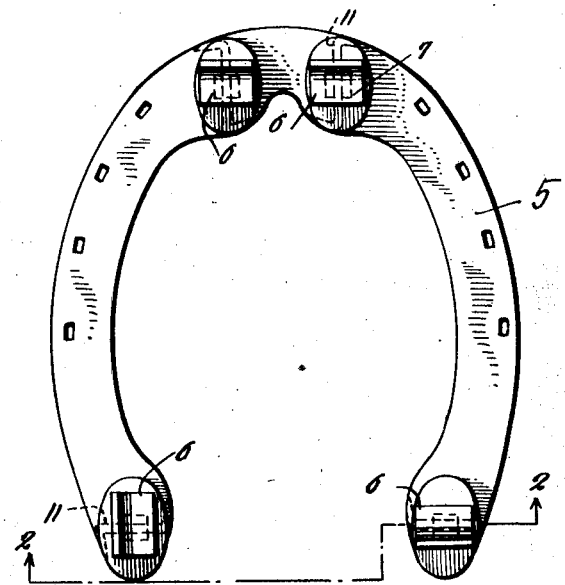
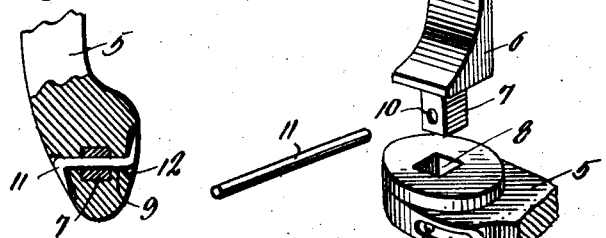
WITNESSES
Inventor
WILLIAM VAN TASSEL Patented Mar. 29, 1927.

1,622,748

UNITED STATES PATENT OFFICE.

WILLIAM VAN TASSEL, OF REDWOOD, NEW YORK.

HORSESHOE.

Application filed April 19, 1926. Serial No. 103,160.

This invention relates to certain new and useful improvements in horseshoes, and has more particular reference to an improved calk arrangement and fastening means therefor.

Horseshoe calks are now in common use having tapered tenons or studs adapted to be driven into vertical openings of the body of the horseshoe at the toe and heel portions of the latter, whereby the tenons have a very secure and tight frictional engagement in the openings of the horseshoe body. After continued use, due to rusting and the entrance of foreign matter in the openings and about the tenons, it is an extremely hard matter to remove the calks for renewal, and the removal of the calks can only be accomplished by the expenditure of considerable time and labor.

It is an object of the present invention to provide a tenon calk fastening through the use of which the calks may be readily manually inserted and removed so as to overcome the above mentioned objections, and to provide an improved method of cross-pinning the tenons of the calks in the horseshoe openings whereby the cross-pins may be readily removed for permitting the manual removal of the calks.

A more specific object of the invention is to provide the calk tenons and horseshoe openings of such form that the tenons have no material frictional engagement in the openings for preventing removal of the calks, the cross-pins acting as the sole means for fastening the calks in place and being of such nature as to be readily removed.

A further object is to provide the tenons and openings of such form as to effectively insure against turning of the calks relative to the horseshoe body whereby proper positioning of the calks is insured.

Still another object is to provide a simple and practical arrangement for cross-pinning the calks to the horseshoe body whereby no projecting ends of the cross-pins are had.

Other objects will appear as the nature of the invention is better understood, and the same consists in the novel form, combination, and arrangement of parts hereinafter more fully described, shown in the accompanying drawing, and claimed.

In the drawing, wherein like reference characters indicate corresponding parts throughout the several views—

Fig. 1 is a bottom plan view of a horseshoe equipped with calks in accordance with the present invention;

Fig. 2 is a view partly in edge elevation and partly in transverse section as seen when taken upon line 2—2 of Fig. 1;

Fig. 3 is a fragmentary detail view partly in section upon line 3—3 of Fig. 2; and Fig. 4 is a developed perspective view showing a heel end portion of the horseshoe body, a calk and a cross-pin therefor prior to assembling of the same.

Referring more in detail to the drawing, 5 indicates the body of the horseshoe which is of the well-known general form and which has a pair of toe calks and a pair of heel calks detachably secured thereto in accordance with the present invention, a heel calk being provided at each heel end portion of the horseshoe body, and a toe calk being provided adjacent to and at each side of the center of the horseshoe body as shown clearly in Fig. 1. Each calk embodies a substantially wedge-shaped ground-engaging portion 6 having a tenon 7 rigid with the larger end thereof, and the horseshoe body is provided with a plurality of vertical openings 8 for removable reception of the tenons of the calks whereby said calks may be detachably secured to the horseshoe body. As shown, the openings 8 are of uniform polygonal cross-section from end to end and are accordingly not tapered, while the calk tenons 7 are of similar form whereby, when the calks are secured in place, turning of the same is effectively prevented. By reason of the uniform cross-section of the tenons and the openings, and the fact that the tenons are of a size to fit within the openings 8 without a great amount of friction, manual detachment or removal of the calks as well as ready insertion of the tenons thereof in the openings is permitted.

A relatively small transverse or cross opening 9 is provided in the horseshoe body 5 to intersect each of the tenon receiving openings 8 and to open through the inner and outer edges of the horseshoe body as shown. The tenon 7 of each calk is also provided with a transverse opening 10 adapted to aline with the associated opening 9 when the calk is positioned in place so that a cross-pin 11 may be passed through the openings 9 and 10 and clinched against the edges of the horseshoe body as shown in Figs. 1 and 3 for effectively securing the calk in place. As shown, grooves 11 are provided in the edges of the horseshoe body so as to extend in opposite directions from the ends of each opening 9 whereby, when the ends of the cross-pin 11 are clinched they will lie within the grooves 12 so as to be countersunk within the edges of the horseshoe body and therefore not project to catch in any adjacent objects or to be capable of causing injury from any cause. The ends of the pins 11 are clinched by the use of a hammer or other suitable tool so that said ends are flattened somewhat as shown in Fig. 3 to more securely insure against accidental disengagement thereof and to present smooth surfaces on the ends of the pins flush with the edges of the horseshoe body.

The cross-pins 11 are formed of fusible metal, such as lead or other equivalent soft material, whereby the ends of the pins may be readily clinched to assume a substantially Z-shaped form when operatively securing the calks in place, and whereby, upon application of a comparatively low degree of heat, the pins may be melted readily for their removal or destruction so that the manual removal of the calks may be effected. This greatly facilitates the replacement of any of the calks from time to time as found necessary, as it is an extremely tedious and time-consuming operation to remove a clinched fastening pin of other than fusible material, even with the aid of special tools.

I prefer to provide the openings 10 in the tenons 7 of the toe calks and one of the heel calks so that such calks will be secured in place with their ground-engaging edges disposed transversely of the horseshoe body, as shown in Fig. 1, for preventing forward and backward slipping, and to provide the transverse opening 10 in the tenon 7 of the remaining heel calk so that the latter is positioned with its ground-engaging edge disposed parallel with the longitudinal axis of the horseshoe body as shown in Figs. 1 and 2 for effectively guarding against sidewise slipping.

From the foregoing it will be seen that upon the application of a low degree of heat, any of the cross-pins 11 may be melted sufficiently to release the associated calk by reason of the destruction of such cross-pin, whereupon the said calk may be readily manually detached for replacement by a new calk. Such manual detachment of the calk is permitted with facility by reason of the fact that there is no substantial friction between the tenon of said calk and the walls of the opening in which said tenon is engaged. As noted above, the lack of friction between the tenons and the walls of the openings 8 permits comparatively free manual insertion of the tenons completely into the openings or disengagement of the tenons from said openings.

From the foregoing description it is believed that the construction and advantages of the present invention will be readily understood and appreciated by those skilled in the art. Minor changes may be made without departing from the spirit and scope of the invention as claimed.

What I claim as new is:—

1. In a horseshoe, a horseshoe body provided with a vertical opening and having a transverse opening intersecting said vertical opening as well as opening through the horseshoe body at the inner and outer edges thereof, a calk provided with a tenon adapted to fit within said vertical opening and provided with a transverse opening adapted to aline with the transverse opening of the horseshoe body, and a fusible cross-pin extending through the transverse openings of the horseshoe body and the calk tenon and clinched against the edges of the horseshoe body, said horseshoe body having oppositely extending grooves in the edges projecting from the ends of the transverse opening in the horseshoe body and in which the ends of the cross-pins are clinched to lie flush with the edges of the horseshoe body.

2. In a horseshoe, a horseshoe body provided with a vertical opening and having a transverse opening intersecting said vertical opening and extending transversely of the shoe body, the ends of the said transverse opening terminating in oppositely extending longitudinal grooves in the edges of the shoe body, a calk provided with a tenon adapted to fit within said vertical opening and provided with a transverse opening adapted to aline with the transverse opening of the shoe body, and a cross-pin extending through the transverse openings of the shoe body and calk tenon, the ends of the cross-pin being bent to fit longitudinally in the grooves formed in the edges of the shoe so as to extend flush with the outer shoe edges.

In testimony whereof I affix my signature.

WILLIAM VAN TASSEL.